United States Patent
Lefevre et al.

(10) Patent No.: US 10,578,026 B2
(45) Date of Patent: Mar. 3, 2020

(54) DUCT BLOCKER SEAL ASSEMBLY FOR A GAS TURBINE ENGINE

(71) Applicant: United Technologies Corporation, Farmington, CT (US)

(72) Inventors: Nicholas Lefevre, Vernon, CT (US); John J. Korzendorfer, Glastonbury, CT (US); Peter Balawajder, West Hartford, CT (US); Paul W. Palmer, South Glastonbury, CT (US); Paul J. Colucci, Glastonbury, CT (US); Mahamoud Coulibaly, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/895,058

(22) Filed: Feb. 13, 2018

(65) Prior Publication Data

US 2018/0179959 A1 Jun. 28, 2018

Related U.S. Application Data

(62) Division of application No. 14/150,411, filed on Jan. 8, 2014, now abandoned.

(60) Provisional application No. 61/775,211, filed on Mar. 8, 2013.

(51) Int. Cl.
| | | |
|---|---|---|
| *F02C 7/28* | (2006.01) | |
| *F01D 11/00* | (2006.01) | |
| *F02K 3/075* | (2006.01) | |
| *F04D 19/02* | (2006.01) | |
| *F04D 27/02* | (2006.01) | |
| *F04D 29/08* | (2006.01) | |

(52) U.S. Cl.
CPC .............. *F02C 7/28* (2013.01); *F01D 11/003* (2013.01); *F02K 3/075* (2013.01); *F04D 19/02* (2013.01); *F04D 27/0215* (2013.01); *F04D 29/083* (2013.01); *F05D 2220/90* (2013.01); *Y02T 50/672* (2013.01)

(58) Field of Classification Search
CPC ... F02K 1/06; F02K 3/10; F02K 3/075; F05D 2240/55; F05D 2220/90; F04D 29/08; F02C 7/28; F01D 11/003; F23R 3/002; F23R 3/283; F23R 2900/00012; F16J 15/0887; F16J 17/073
See application file for complete search history.

(56) References Cited

U.S. PATENT DOCUMENTS

| | | | | |
|---|---|---|---|---|
| 3,161,318 A | * | 12/1964 | Krueger | ............... F16J 15/0887 |
| | | | | 220/304 |
| 3,163,431 A | | 12/1964 | Tanner | |
| 3,275,335 A | * | 9/1966 | Johnson | ............... F16J 15/0887 |
| | | | | 277/639 |
| 3,783,618 A | | 1/1974 | Kawamura | |
| 3,879,940 A | * | 4/1975 | Stenger | ................... F23R 3/283 |
| | | | | 60/737 |

(Continued)

*Primary Examiner* — Andrew H Nguyen
(74) *Attorney, Agent, or Firm* — Getz Balich LLC

(57) ABSTRACT

A seal system for a gas turbine engine includes a cover plate with a radial flange; a seal carrier adjacent the cover plate; an outer compliant seal supported by the seal carrier; an inner compliant seal supported by the seal carrier, the inner compliant seal engaged with the radial flange; and a spring between the cover plate and the seal carrier.

16 Claims, 16 Drawing Sheets

(56) References Cited

U.S. PATENT DOCUMENTS

| | | | |
|---|---|---|---|
| 3,915,462 A * | 10/1975 | Bruns | F16J 15/021 |
| | | | 277/647 |
| 4,093,122 A | 6/1978 | Linderman et al. | |
| 4,361,331 A | 11/1982 | Kohler | |
| 5,809,772 A | 9/1998 | Giffin, III et al. | |
| 6,471,216 B1 | 10/2002 | Brainch et al. | |
| 6,481,211 B1 | 11/2002 | Haas | |
| 7,823,375 B2 | 11/2010 | Zack et al. | |
| 7,836,701 B2 | 11/2010 | Zack et al. | |
| 8,091,371 B2 | 1/2012 | Durocher et al. | |
| 8,141,366 B2 | 3/2012 | Zamora et al. | |
| 8,206,102 B2 | 6/2012 | Moon | |
| 8,221,062 B2 | 7/2012 | Liotta et al. | |
| 8,240,126 B2 | 8/2012 | Schirtzinger | |
| 8,246,299 B2 | 8/2012 | Razzell et al. | |
| 8,286,416 B2 | 10/2012 | Schirtzinger et al. | |
| 8,366,113 B2 * | 2/2013 | Swensen | F16J 15/0887 |
| | | | 277/312 |
| 8,366,382 B1 | 2/2013 | Muldoon et al. | |
| 8,408,557 B2 | 4/2013 | Taylor et al. | |
| 2005/0220611 A1 | 10/2005 | Bhate et al. | |
| 2006/0110246 A1 * | 5/2006 | Bruce | F01D 17/162 |
| | | | 415/160 |
| 2010/0111677 A1 * | 5/2010 | Kilminster | F01D 17/162 |
| | | | 415/160 |
| 2012/0195743 A1 | 8/2012 | Walunj et al. | |
| 2013/0001892 A1 * | 1/2013 | Smith | F01D 17/143 |
| | | | 277/637 |

* cited by examiner

DUCT BLOCKER SEAL ASSEMBLY FOR A GAS TURBINE ENGINE

This patent application is a divisional of and claims priority to U.S. patent application Ser. No. 14/150,411 filed Jan. 8, 2014, which claims priority to U.S. Patent Appln. No. 61/775,211 filed Mar. 8, 2013. The '411 application and the '211 application are each hereby incorporated herein by reference in its entirety.

STATEMENT REGARDING FEDERALLY SPONSORED RESEARCH OR DEVELOPMENT

This disclosure was made with Government support under N00019-02-C-3003 awarded by the United States Navy. The Government has certain rights in this disclosure.

BACKGROUND

The present disclosure relates to gas turbine engines, and more particularly to a duct blocker system therefore.

Gas turbine engines, such as those which power modern military aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section, an augmentor section, or "afterburner", is operable to selectively increase the thrust. The increase in thrust is produced when fuel is injected into the core exhaust gases downstream of the turbine section and burned with the oxygen contained therein to generate a second combustion.

Certain engine architectures advantageously modulate airflow with a blocker system to facilitate V/STOL operations and/or selectively control third stream airflow in a variable cycle engine architecture.

SUMMARY

A gas turbine engine according to one disclosed non-limiting embodiment of the present disclosure includes an outer case; a blocker ring mounted within the outer case; a tab that extends from the blocker ring through the outer case; a cover plate mountable to the outer case to surround the tab; a first support adjacent the cover plate; an outer compliant seal supported by the first support to seal with the cover plate; a second support at least partially supported by the first support; an inner compliant seal supported by the second support to seal with the blocker ring; and a spring between the second support and the first support.

A further embodiment of the present disclosure includes, wherein the outer case is manufactured of a first material and the blocker ring is manufactured of a second material, the first material different than the second material.

A further embodiment of any of the foregoing embodiments of the present disclosure includes, wherein the tab extends through a slot in the cover plate.

A further embodiment of any of the foregoing embodiments of the present disclosure includes a stationary blocker ring mounted to the outer case, the blocker ring movable relative to the stationary fan duct blocker ring.

A further embodiment of any of the foregoing embodiments of the present disclosure includes an actuator mounted to the outer case, the actuator engaged with the tab.

A further embodiment of any of the foregoing embodiments of the present disclosure includes, wherein the blocker ring is mounted within a fan duct.

A further embodiment of any of the foregoing embodiments of the present disclosure includes, wherein the outer duct at least partially defines a turbine exhaust case.

A further embodiment of any of the foregoing embodiments of the present disclosure includes, wherein the turbine exhaust case at least partially defines an augmentor section of the gas turbine engine.

A gas turbine engine according to another disclosed non-limiting embodiment of the present disclosure includes an outer case; a blocker ring mounted within the outer case; a tab that extends from the blocker ring through the outer case; a cover plate mountable to the outer case to surround the tab, the cover plate defines a radial flange; a seal carrier adjacent the cover plate; an outer compliant seal supported by the seal carrier, the outer compliant seal engaged with the outer case; an inner compliant seal supported by the seal carrier, the inner compliant seal engaged with the radial flange; and a spring between the cover plate and the seal carrier.

A further embodiment of any of the foregoing embodiments of the present disclosure includes, wherein the outer case is manufactured of a first material and the blocker ring is manufactured of a second material, the first material different than the second material.

A further embodiment of any of the foregoing embodiments of the present disclosure includes, wherein the tab extends through a slot in the cover plate.

A further embodiment of any of the foregoing embodiments of the present disclosure includes a stationary blocker ring mounted to the outer case, the blocker ring movable relative to the stationary fan duct blocker ring.

A further embodiment of any of the foregoing embodiments of the present disclosure includes an actuator mounted to the outer case, the actuator engaged with the tab.

A further embodiment of any of the foregoing embodiments of the present disclosure includes, wherein the blocker ring is mounted within a fan duct.

A further embodiment of any of the foregoing embodiments of the present disclosure includes, wherein the outer duct at least partially defines a turbine exhaust case.

A further embodiment of any of the foregoing embodiments of the present disclosure includes, wherein the turbine exhaust case at least partially defines an augmentor section of the gas turbine engine.

A further embodiment of any of the foregoing embodiments of the present disclosure includes, wherein the seal carrier defines a sliding surface that slides upon the blocker ring.

A further embodiment of any of the foregoing embodiments of the present disclosure includes, wherein the sliding surface is non-linear.

A seal system for a gas turbine engine according to another disclosed non-limiting embodiment of the present disclosure includes a cover plate with a radial flange; a seal carrier adjacent the cover plate; an outer compliant seal supported by the seal carrier; an inner compliant seal supported by the seal carrier, the inner compliant seal engaged with the radial flange; and a spring between the cover plate and the seal carrier.

A further embodiment of any of the foregoing embodiments of the present disclosure includes, wherein the radial flange is racetrack shaped.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
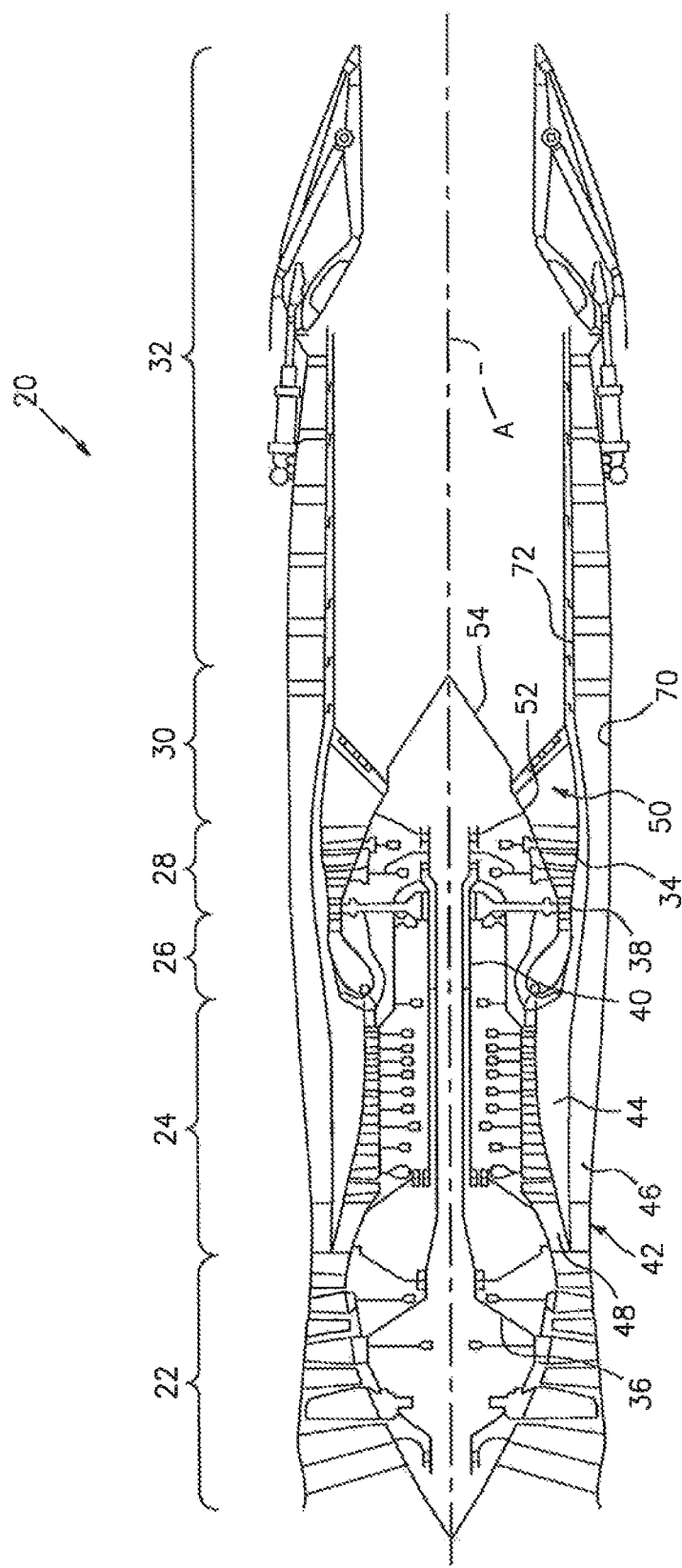
FIG. 1 is a general schematic, cross-sectional view of an exemplary gas turbine engine embodiment for use with the present disclosure.

FIG. 1 schematically illustrates a gas turbine engine 20. The gas turbine engine 20 generally incorporates a fan section 22, a compressor section 24, a combustor section 26, a turbine section 28, an augmenter section 30 and an exhaust duct section 32. Although depicted as an augmented low bypass gas turbine engine in the disclosed non-limiting embodiment, it should be understood that the concepts described herein are applicable to other gas turbine engines including geared architecture engines, direct drive turbofans, turbojet, turboshaft, ramjet and other engine architectures.

The compressor section 24, the combustor section 26 and the turbine section 28 are generally referred to as the engine core defined along a central longitudinal engine axis A. The fan section 22 and a low pressure turbine 34 of the turbine section 28 are coupled by a first shaft 36 to define a low spool. The compressor section 24 and a high pressure turbine 38 of the turbine section 28 are coupled by a second shaft 40 to define a high spool.

An outer engine structure 42 and an inner engine structure 44 define a generally annular secondary airflow path 46 around a primary airflow path 48 of the engine core. It should be understood that various structure within the engine may define the outer engine structure 42 and the inner engine structure 44 which essentially define an exoskeleton to support the rotating hardware therein.

Air that enters the fan section 22 is divided between a core flow through the primary airflow path 48 and a secondary airflow through the secondary airflow path 46. The core flow passes through the combustor section 26, the turbine section 28, then the augmentor section 30 where fuel may be selectively injected and burned to generate additional thrust through the exhaust duct section 32. The secondary airflow may be utilized for a multiple of purposes to include, for example, cooling and pressurization. The secondary airflow as defined herein is any airflow different than the primary combustion gas exhaust airflow. The secondary airflow passes through an annulus defined by the outer engine case structure 42 and the inner engine structure 44 then may be at least partially injected into the primary airflow path 48 adjacent the augmentor section 30 and the exhaust duct 32.

The augmenter section 30 generally includes an outer case 70, a turbine exhaust case (TEC) 50, and a center body 52 with a conically shaped tail cone 54. The outer case 70 of the outer engine case structure 42 has a concentrically spaced inner liner 72 that operates as a heat shield to protect said outer case 70 from the exhaust gas flow in the flow path. Airflow from, for example, the fan section 22 may be communicated through the secondary airflow path 46 defined in part by the outer case 70 and the inner liner 72.

Figure 2:
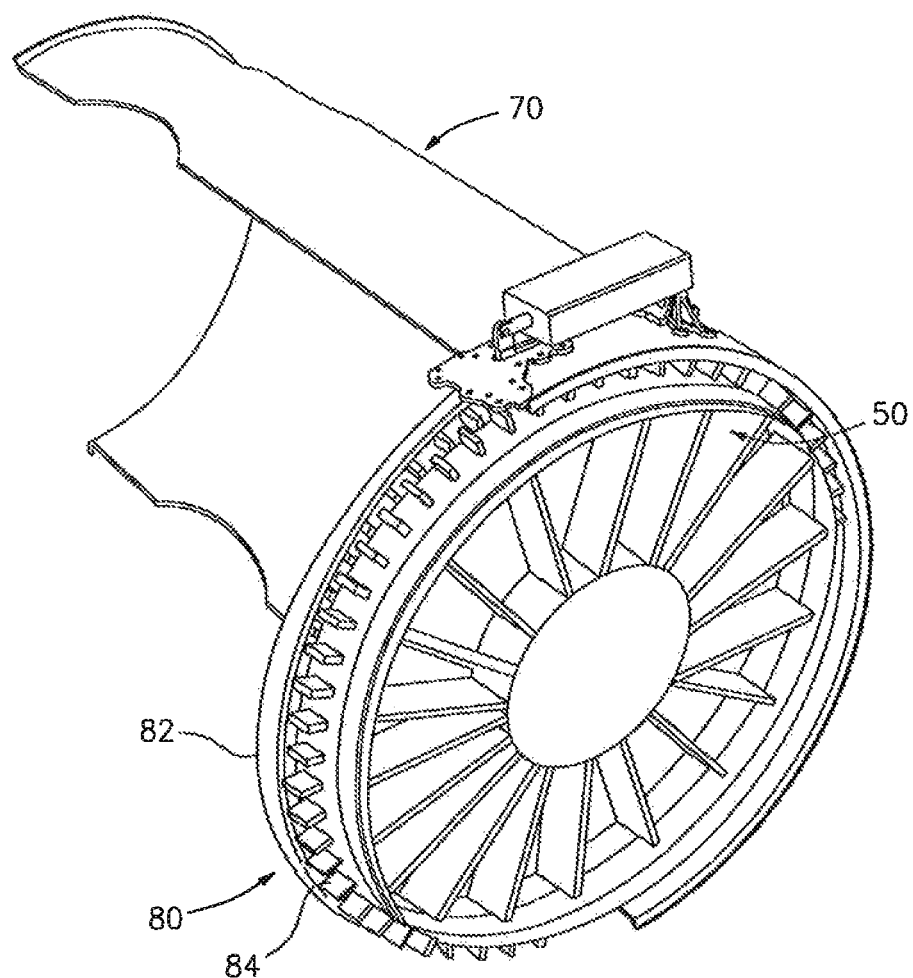
FIG. 2 is a partial sectional isometric view of a duct blocker system.
Figure 3:
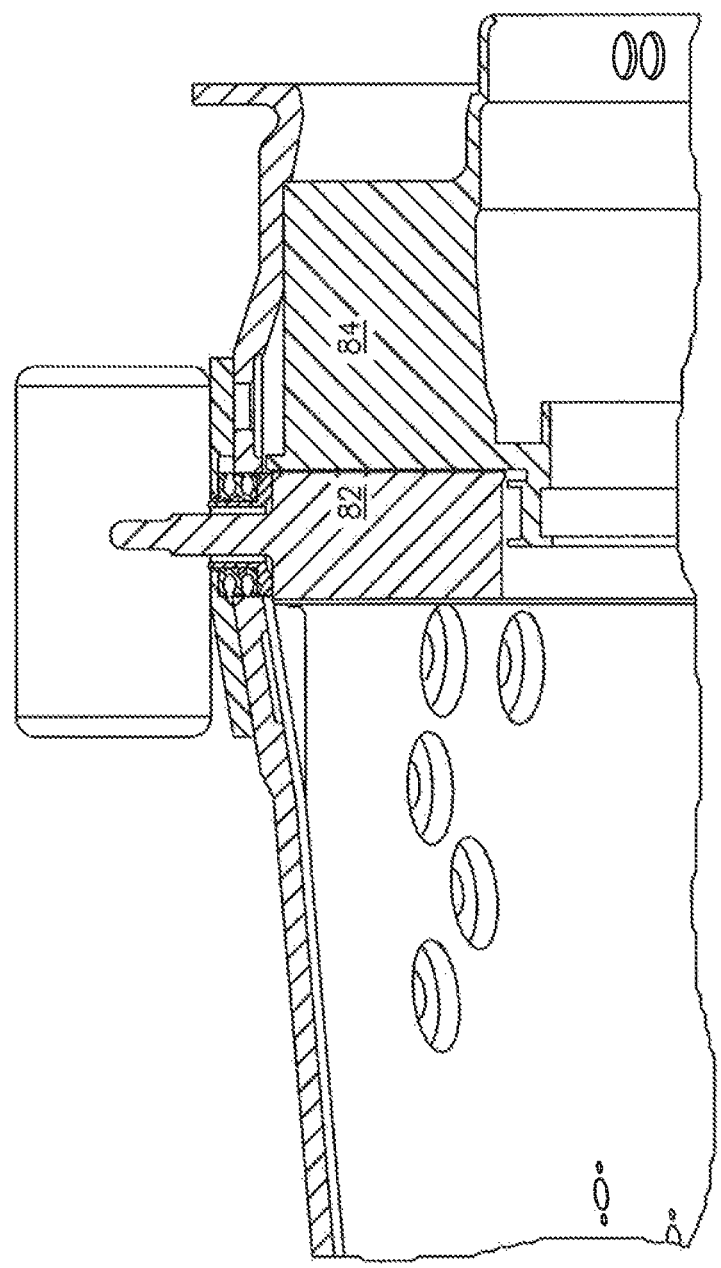
FIG. 3 is an expanded sectional view of the duct blocker system.
Figure 4:
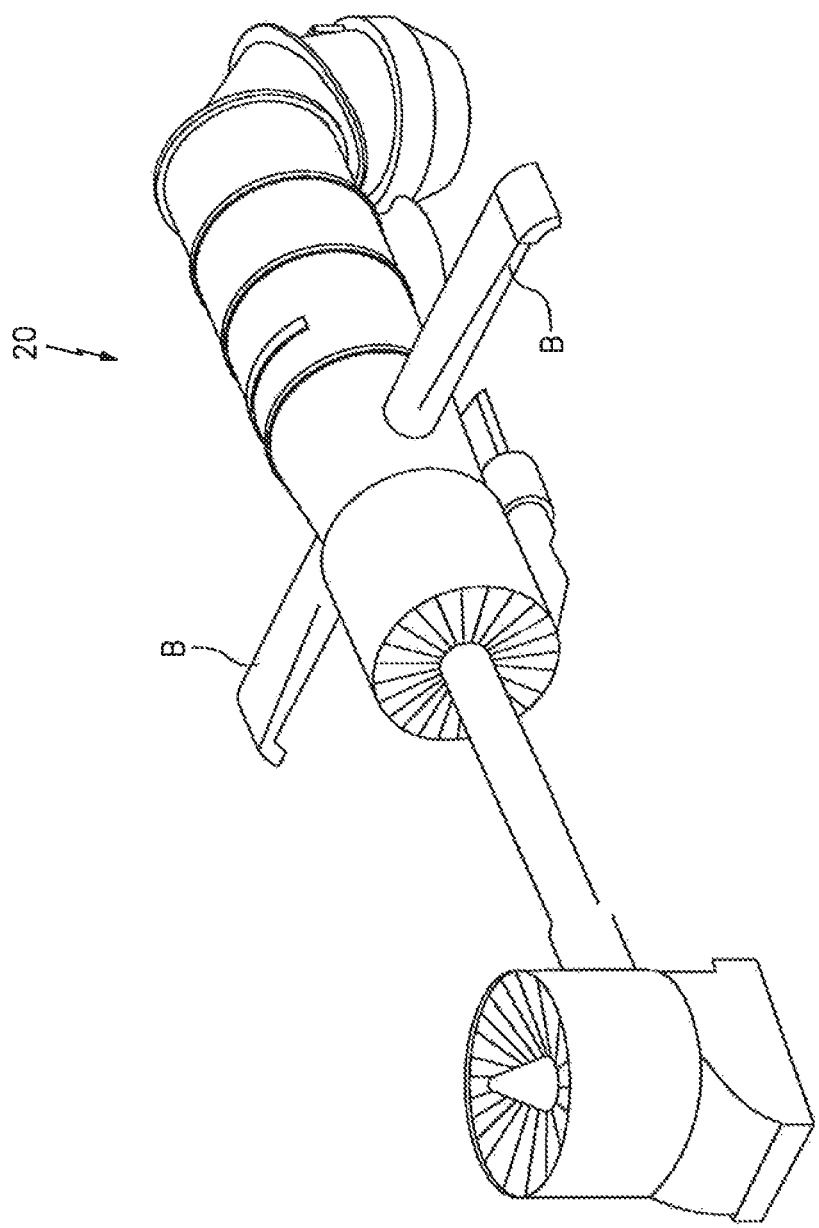
FIG. 4 is a general schematic isometric view of an exemplary gas turbine engine embodiment for use with the present disclosure.

With reference to FIG. 2, a duct blocker system 80 may be located between the outer case 70 and the TEC 50 to modulate the secondary airflow path 46 from, for example the fan section 22. It should be appreciated that the duct blocker system 80 may be located in other locations in other engine architectures. The duct blocker system 80 rotates a forward blocker ring 82 relative a rotationally fixed aft blocker ring 84 to define a variable area throat through alignment or offset of a multiple of airfoils (also shown in FIG. 3) to selectively modulate fan airflow into, for example, a set of roll control ducts B (FIG. 4) to facilitate V/STOL operations. It should be appreciated that various other usages such as selectively control of airflow through a third stream airflow path of a variable cycle engine architecture will also benefit herefrom.

Figure 5:
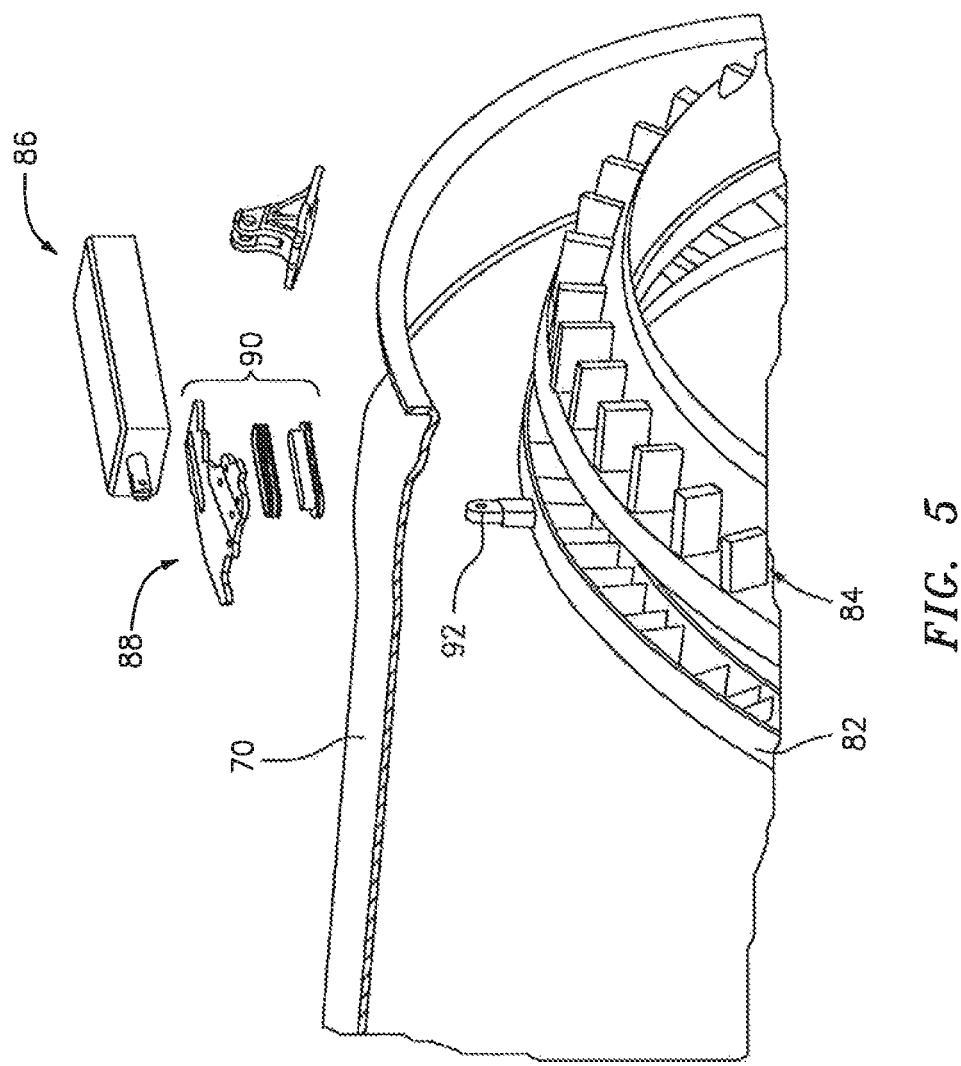
FIG. 5 is an exploded view of the duct blocker system.
Figure 6:
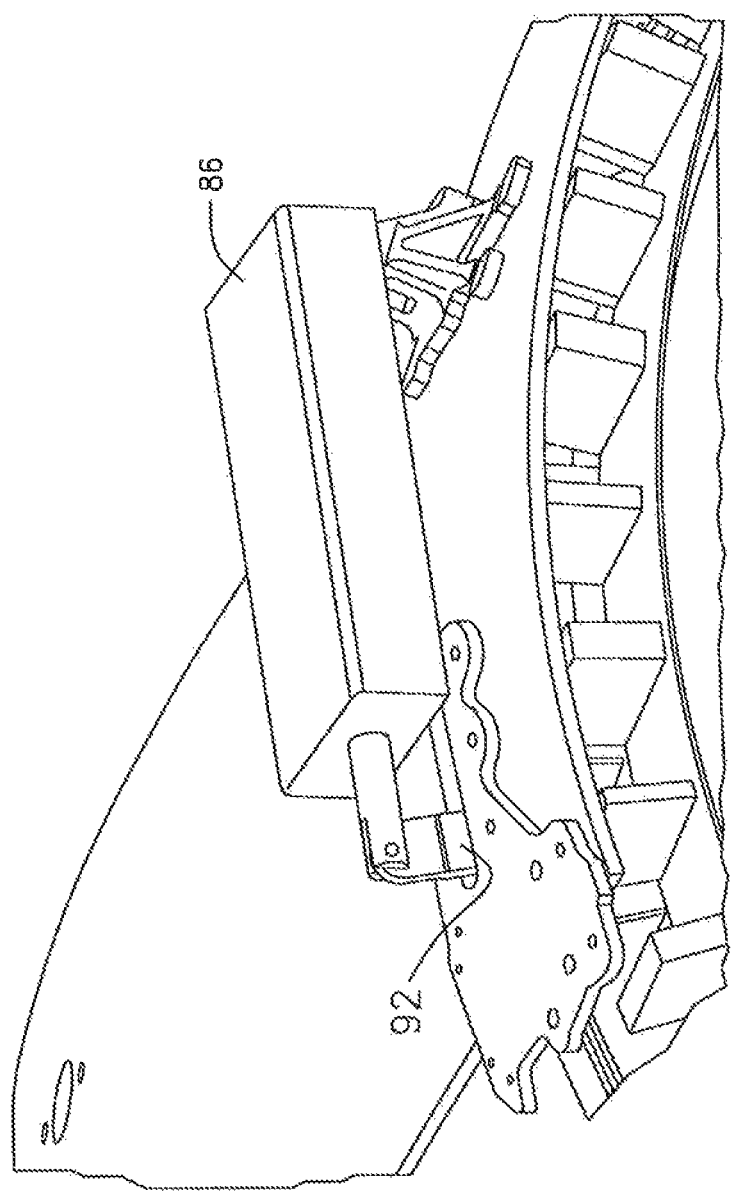
FIG. 6 is a perspective end view of the duct blocker system.

With reference to FIG. 5, the duct blocker system 80 generally includes the forward blocker ring 82, the rotationally fixed aft blocker ring 84, an actuator 86, and a sealing system 90. The sealing system 90 is positioned between the outer case 70 and the forward blocker ring 82 to maintain air pressure overboard. A blocker ring tab 92 attached to the forward blocker ring 82 protrudes through the outer case 70 and cover plate 88 to permit rotation of the forward blocker ring 82 via the actuator 86 (FIG. 6).

The sealing system 90 seals air pressure as well as accommodate relatively large radial deflections in a confined axial space due to differences in thermal growth between the outer case 70 and the forward blocker ring 82. The sealing system 90 accommodates significant radial displacement as the outer case 70 may be manufactured of one material such as an organic matrix composite material while the forward blocker ring 82 may be manufactured of another material such as titanium, each of which has significantly different coefficients of thermal expansion. The sealing system 90 also withstands relatively high temperatures and high operational pressures. The sealing system 90 also accommodates dynamic rotational movements and relatively small "dither" movements from the actuator 86. The sealing system 90 may be of an annular racetrack shape to comply with the design space. It should be understood that other annular shapes such as rectilinear and others will also benefit herefrom.

Figure 7:
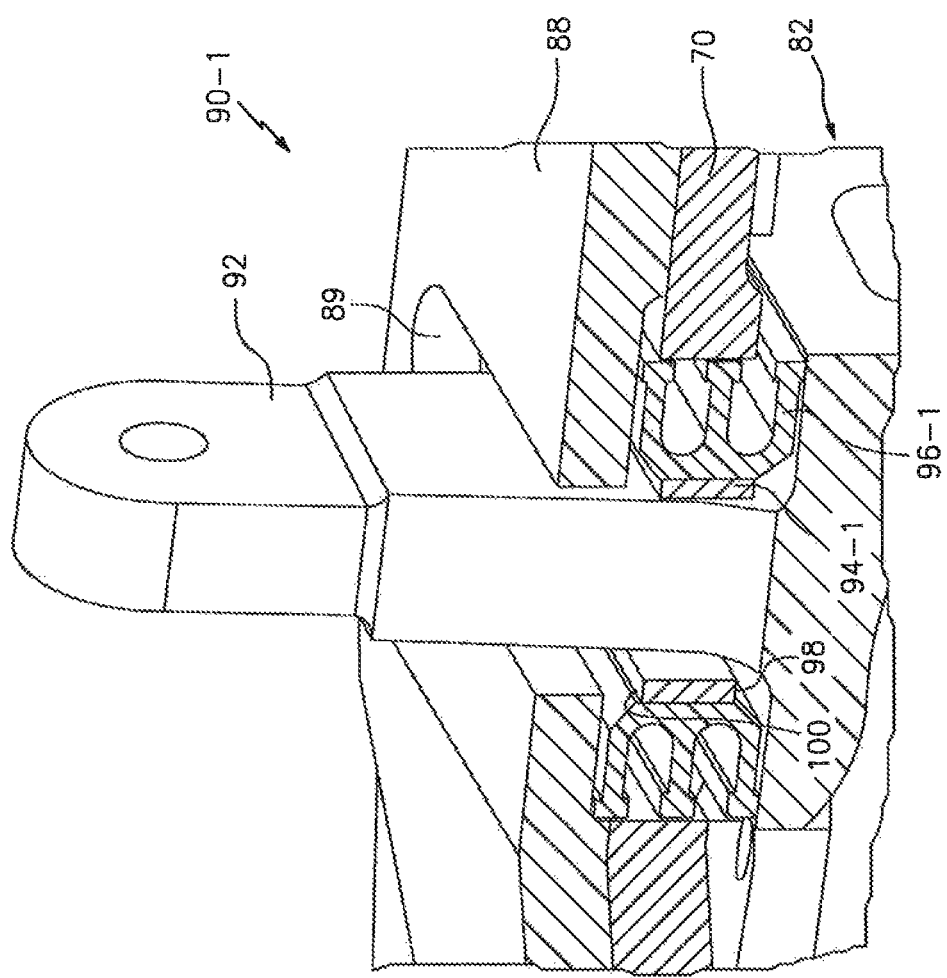
FIG. 7 is an expanded partial perspective sectional view of a seal system for the duct blocker system according to one disclosed non-limiting embodiment.

With reference to FIG. 7, the sealing system 90-1 in one disclosed non-limiting embodiment generally includes a seal carrier 94-1 and a compliant seal 96-1 that are of a racetrack shape to seal a slot-shaped opening 89 in the cover plate 88. The seal carrier 94-1 may be manufactured of a rigid material such as a metal alloy to provide axial support to the compliant seal 96-1 and limit contact with the blocker ring tab 92. The seal carrier 94-1 also reduces the sealed gap, which reduces the possibility of extrusion of the compliant seal 96-1. The seal carrier 94-1 may provide a machined radius on an inboard surface 98 and an outboard surface 100 to closely fit the forward blocker ring 82 and provide mistake-proof installation. Alternatively, the seal carrier 94-1 is machined only on the inboard surface 98 to increase stiffness and reduce the extrusion gap.

Figure 8:
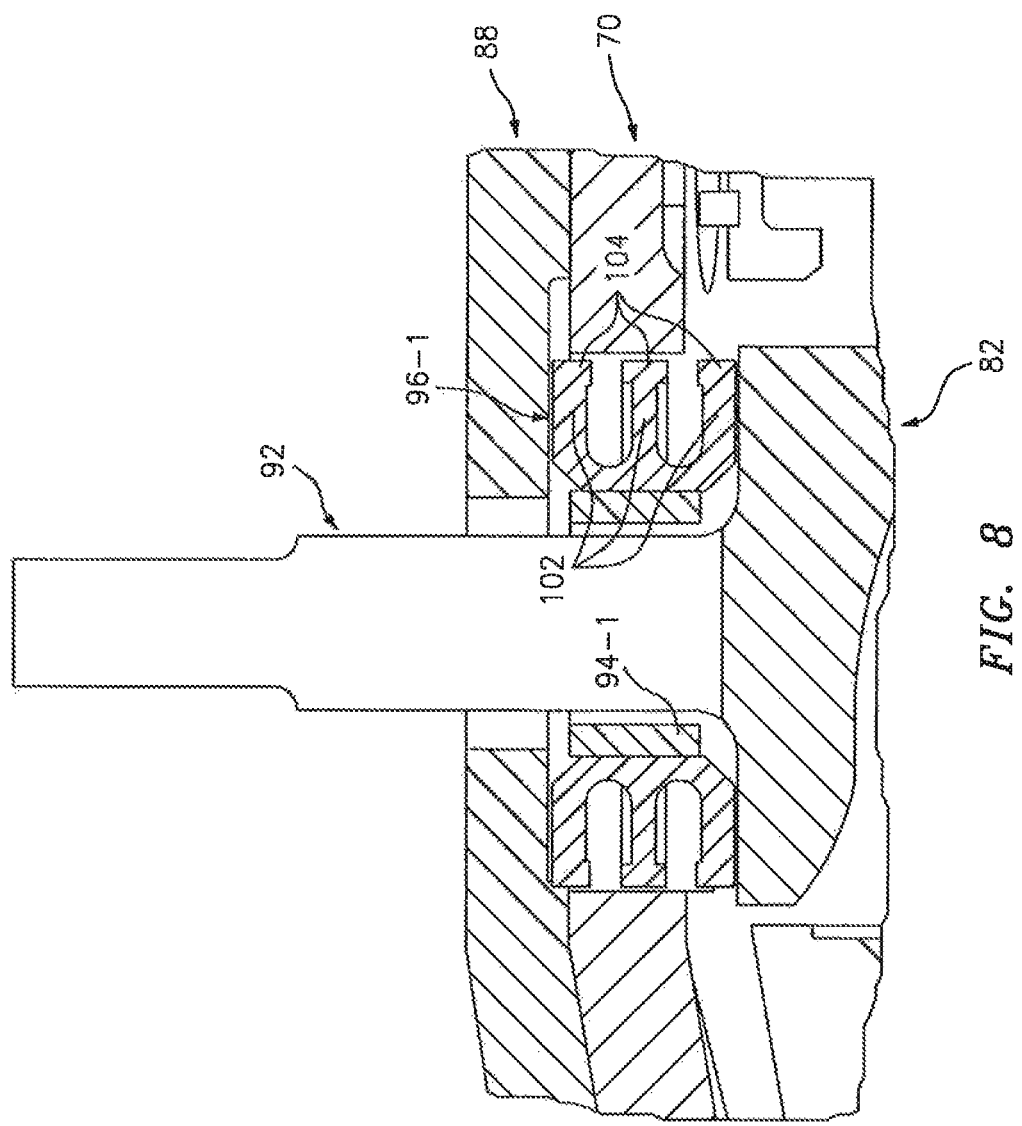
FIG. 8 is an expanded sectional view of the seal system of FIG. 7.

With reference to FIG. 8, the compliant seal 96-1 may be manufactured of a compliant material and define an "E" shape in cross-section. Each leg 102 of the compliant seal 96-1 may include a distal end 104 that is thicker than the leg 102 to facilitate a seal interface with the outer case 70, the cover plate 88 and the forward blocker ring 82. It should be understood that other cross-sectional shapes for the distal ends 104 may alternatively be provided.

Figure 9:
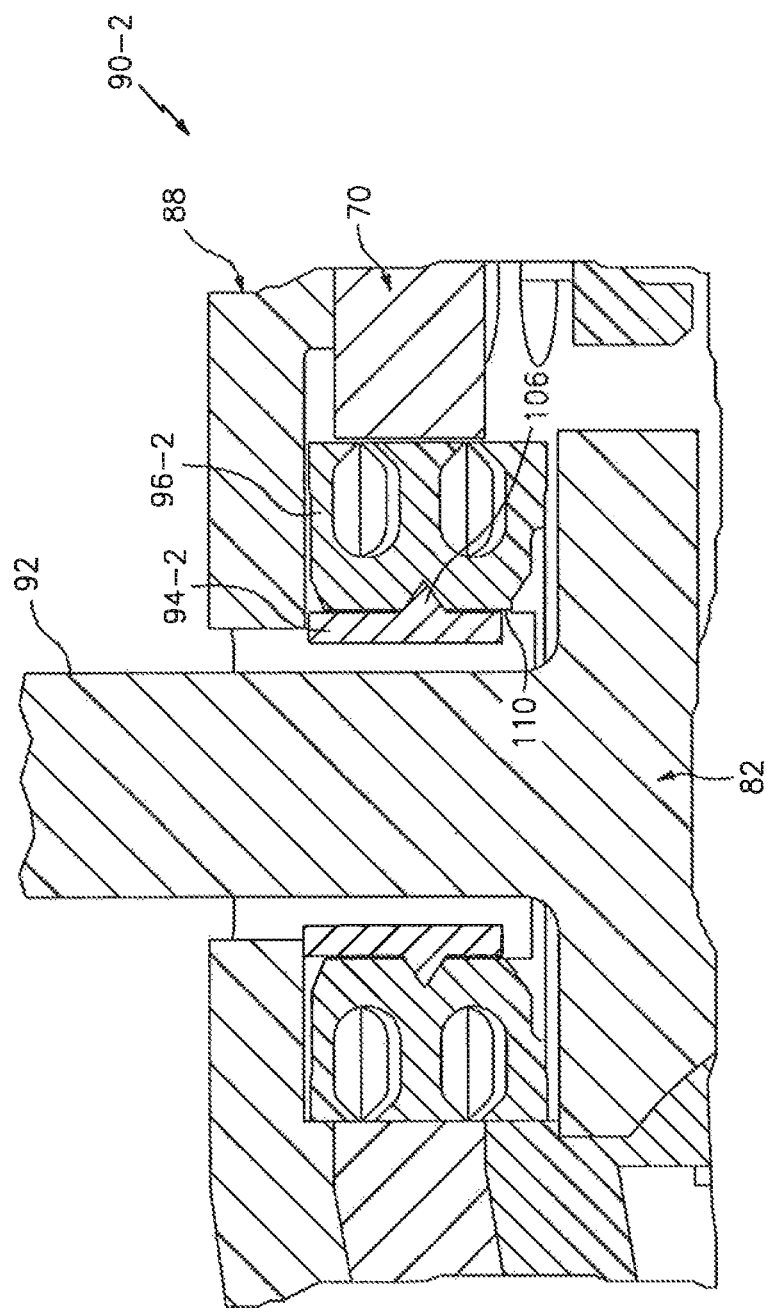
FIG. 9 is an expanded sectional view of a seal system for the duct blocker system according to another disclosed non-limiting embodiment.
Figure 10:
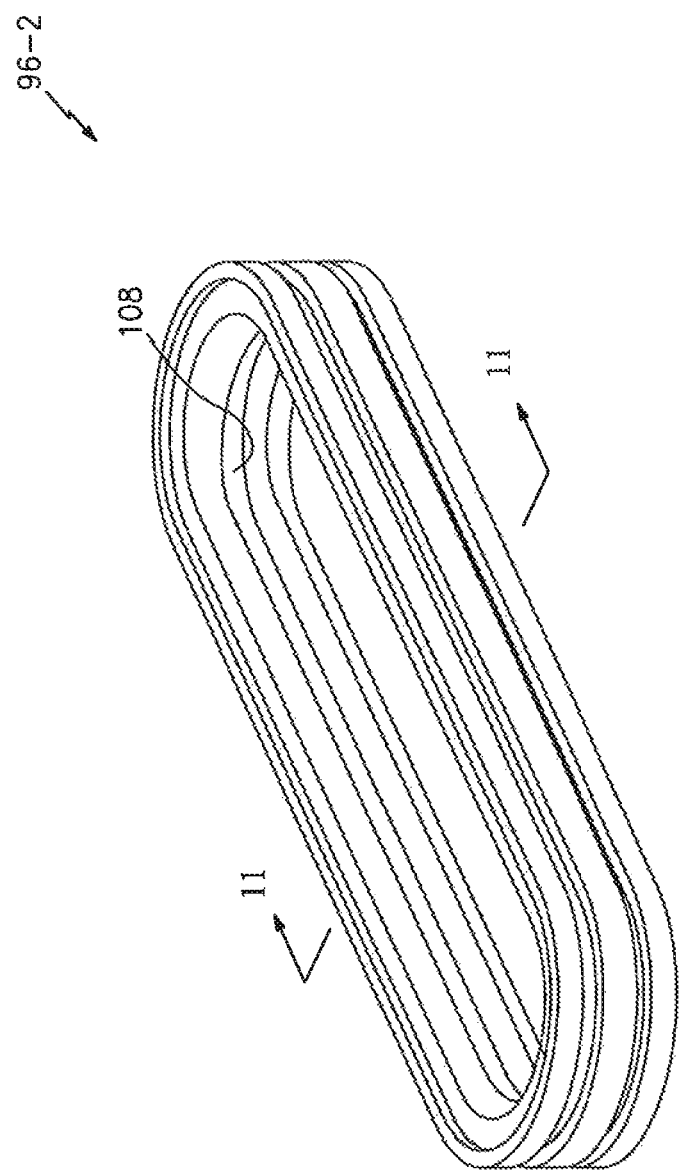
FIG. 10 is an expanded perspective view of a compliant seal of the seal system of FIG. 9.
Figure 11:
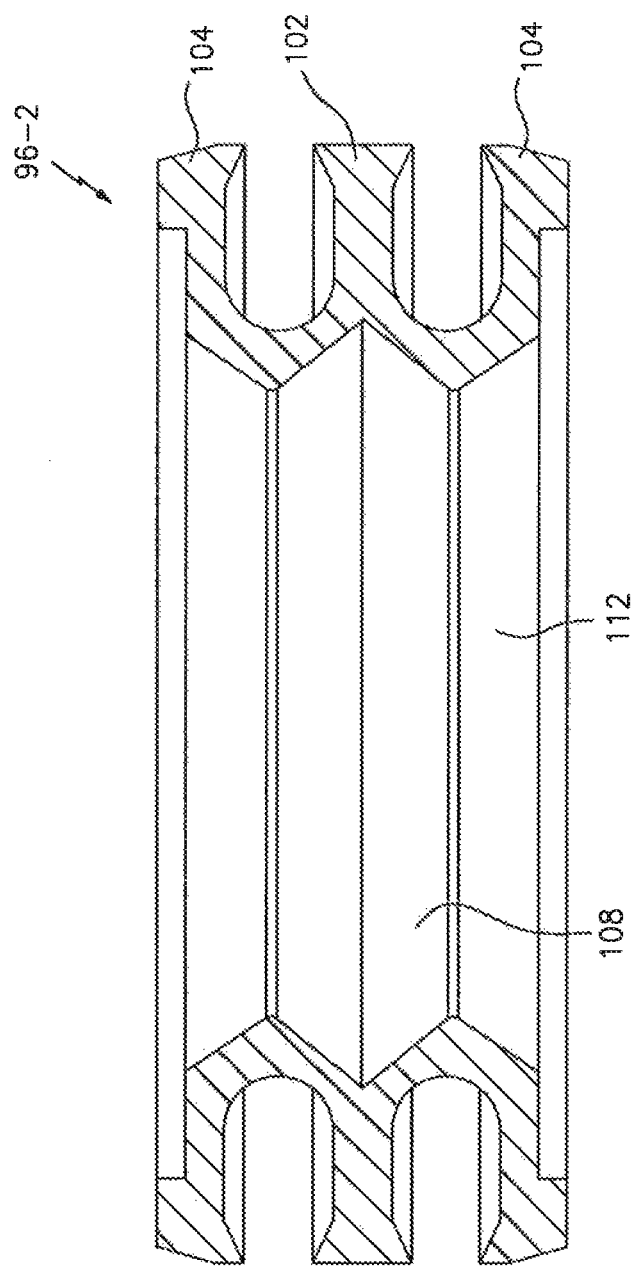
FIG. 11 is an expanded sectional view of the compliant seal of FIG. 10.

With reference to FIG. 9, a sealing system 90-2 in another disclosed non-limiting embodiment generally includes a seal carrier 94-2 and a compliant seal 96-2. The seal carrier 94-2 includes an alignment rib 106 that interfaces with a slot 108 in the compliant seal 96-2 (FIGS. 10 and 11). The alignment rib 106 is located about an outer periphery 110 of the seal carrier 94-2 and the slot 108 is located about an inner periphery 112 of the compliant seal 96-2. In one disclosed, non-limiting embodiment, the slot 108 is located opposite the central leg 102. Each leg 102 of the compliant seal 96-2 includes a distal end 104 that is thicker than the leg 102. In this disclosed non-limited embodiment the distal end 104 is triangular shaped.

In cross section (FIG. 9), the alignment rib 106 can take the shape of a square, rectangle, triangle, oval, circle, I-Beam, polygon, or any other geometry. The alignment rib 106 provides a stiffness increase that resists collapse of the compliant seal 96-2 under pressure into the actuation blocker ring tab 92 to facilitate a more compact design. The alignment rib 106 also positions and maintains the compliant seal 96-2 within the rigid seal carrier 94-2 to facilitate assembly.

Figure 12:
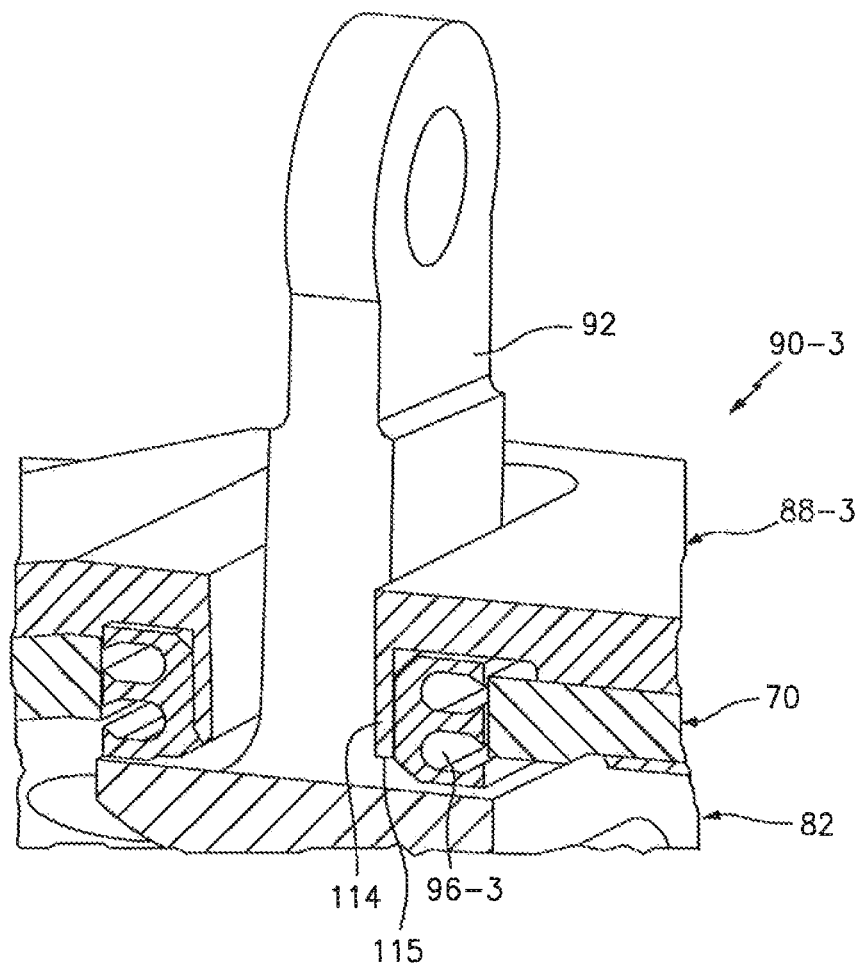
FIG. 12 is an expanded partial perspective sectional view of a seal system for the duct blocker system according to another disclosed non-limiting embodiment.

With reference to FIG. 12, a sealing system 90-3 in another disclosed non-limiting embodiment generally includes a cover plate 88-3 with a cover plate radial flange 114. The cover plate radial flange 114 supports and positions the compliant seal 96-3 as well as eliminates the separate seal carrier as describe above. The stiffness of the cover plate radial flange 114 limits deflections of the compliant seal 96-3 when pressurized as well as provides a close interface with the blocker ring tab 92.

The compliant seal 96-3 may be installed onto the cover plate radial flange 114 to facilitate assembly and protect the compliant seal 96-3 from the blocker ring tab 92. This configuration eliminates any seal gap on the cover plate side. The cover plate radial flange 114 extends radially generally parallel to the blocker ring tab 92 for a distance to accommodate the full thermal expansion (radial) movement of the forward blocker ring 82. The cover plate radial flange 114 also defines an inner surface contour 115 that matches the radius of the forward blocker ring 82. That is, the inner surface contour 115 may be non-linear.

The cover plate radial flange 114 beneficially facilitates a proper seal of the design space and prevents undesirable axial deflection into the blocker ring tab 92 during engine operation. The cover plate radial flange 114 also facilitates a reduction in the sealed gap which thereby decreases the possibility of seal extrusion which may otherwise contribute to the reduced service life.

Figure 13:
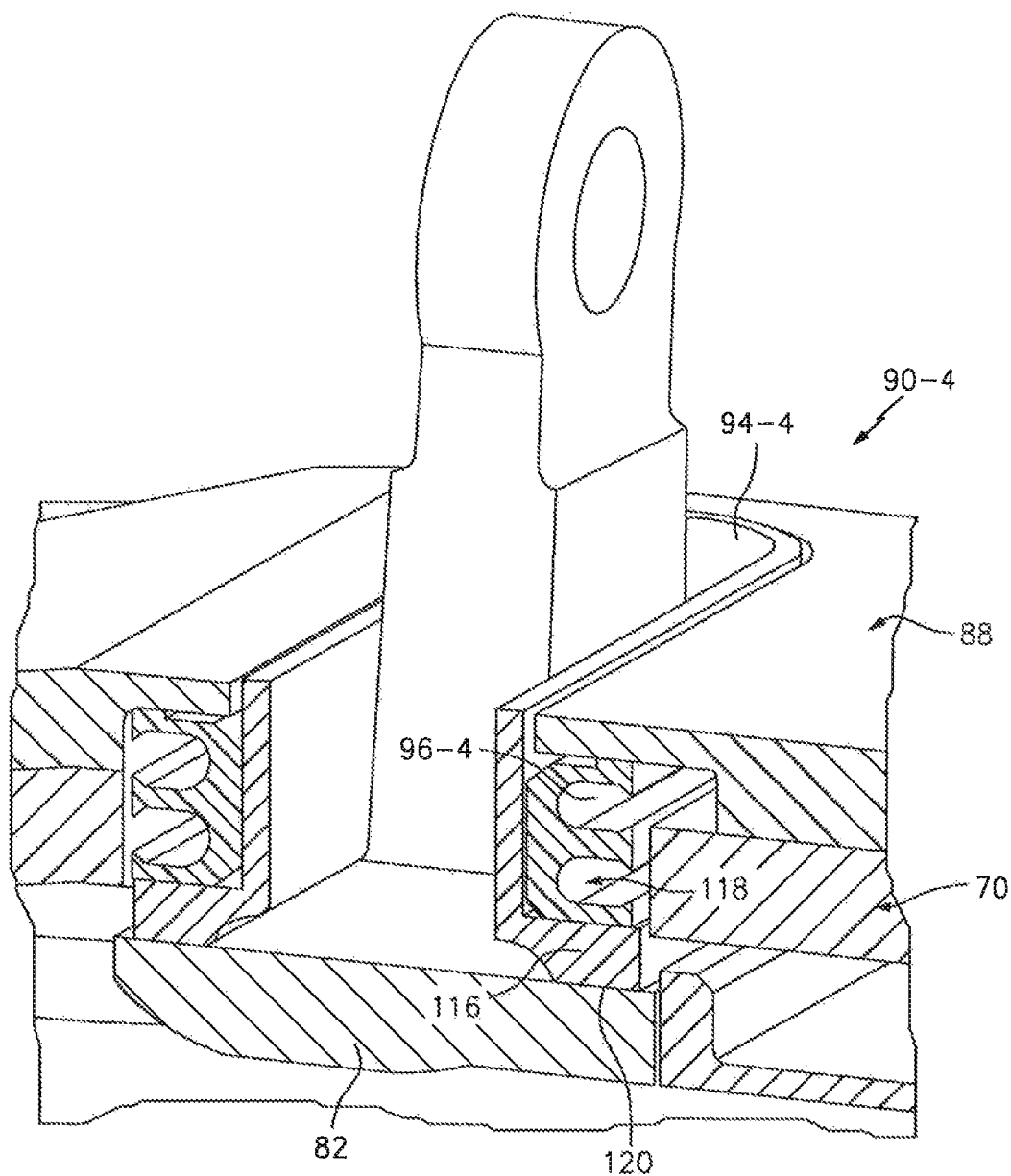
FIG. 13 is an expanded partial perspective sectional view of a seal system for the duct blocker system according to another disclosed non-limiting embodiment.

With reference to FIG. 13, a sealing system 90-4 in another disclosed non-limiting embodiment generally includes a seal carrier 94-4 with a seal carrier flange 116. The seal carrier flange 116 supports and positions the compliant seal 96-4. The seal carrier flange 116 extends generally conformal with the forward blocker ring 82 a close interface therewith. That is, the seal carrier flange 116 is non-linear and follows the radius of the forward blocker ring 82. The seal carrier 94-4 forms a telescoping space 118 to encase the compliant seal 96-4. Any radial extrusion gap common to O-ring type designs is thereby reduced to a single axial gap.

The seal carrier 94-4 positions the compliant seal 96-4 within the outer case 70 and is dimensioned such that the seal carrier 94-4 will maintain contact with the outer case 70 and cover plate 88 while limiting deflection of the compliant seal 96-4. This eliminates the sliding of the compliant seal 96-4 during rotation of the forward blocker ring 82 and provides a sliding interface with the seal carrier 94-4 rather than the compliant seal 96-4. A sliding surface 120 on the seal carrier 94-4 may alternatively be lined with a low friction wear resistant material such as Teflon.

The seal carrier 94-4 facilitates proper sealing of the design space. The seal carrier 94-4 may be manufactured of the same material as the forward blocker ring 82. The seal carrier 94-4 readily accommodates the radial deflections due to thermal growth between the outer case 70 and forward blocker ring 82 by allowing the seal carrier 94-4 to extend radially outward through the cover plate 88. This provides a design space operable to meet full compression due to thermal growth. The gap is also reconfigured from a radial gap to an axial gap. In addition, the seal carrier 94-4 protects the compliant seal 96-4 from contact with the blocker ring tab 92. The seal carrier 94-4 also beneficially provides a static surface for the compliant seal 96-4 and moves the sliding surface and wear potential to the seal carrier 94-4.

Figure 14:
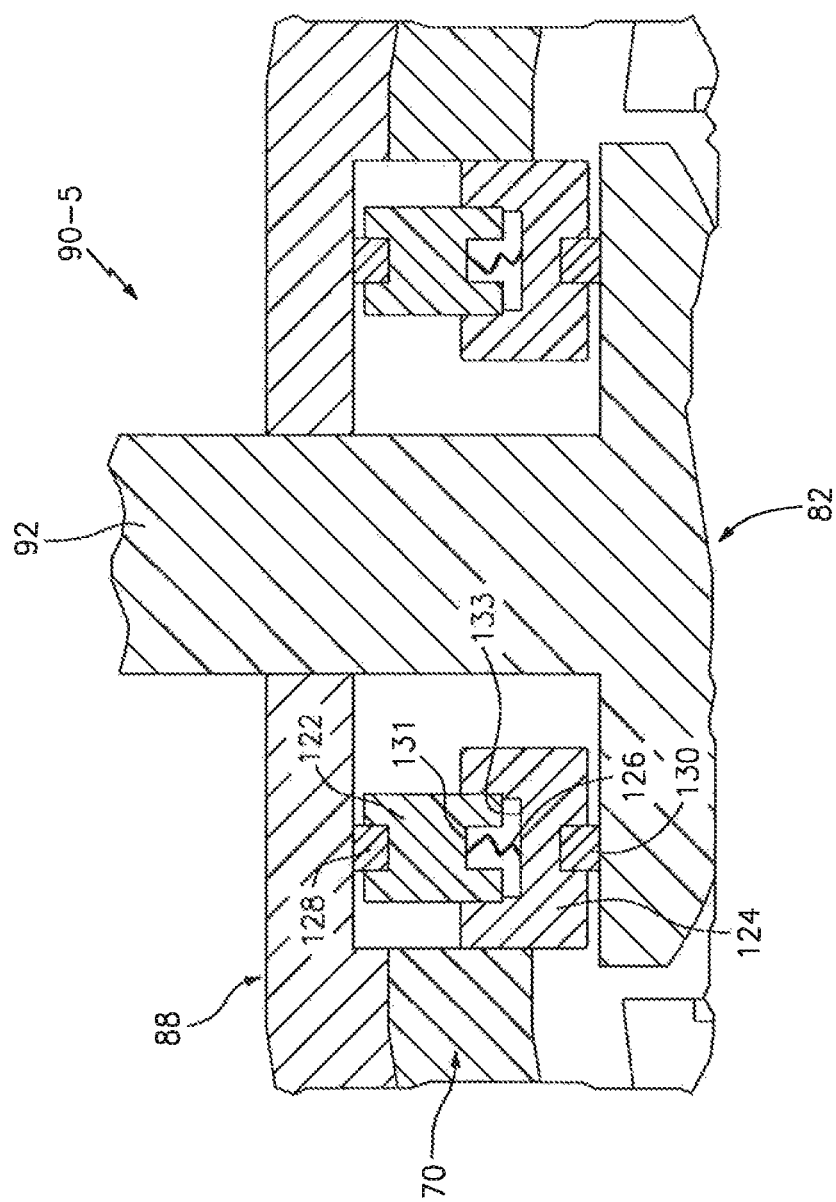
FIG. 14 is an expanded sectional view of a seal system for the duct blocker system according to another disclosed non-limiting embodiment.

With reference to FIG. 14, a sealing system 90-5 in another disclosed non-limiting embodiment generally includes a first support ring 122, a second support ring 124, a spring 126, an outer compliant seal 128 and an inner compliant seal 130. The first support ring 122 and the second support ring 124 respectively support the outer compliant seal 128 and the inner compliant seal 130. The spring 126 biases the first support ring 122 away from the second support ring 124 such that the outer compliant seal 128 seals with the cover plate 88 and the inner compliant seal 130 seals with the forward blocker ring 82.

The spring 126 may be located within a first recess 131 in the first support ring 122 and a second recess 133 in the second support ring 124. The first support ring 122 is also at least partially received within the second recess 133 to provide stability therebetween as the first support ring 122 telescopes with respect to the second support ring 124.

The first support ring 122 and the second support ring 124 may be manufactured of metal alloy and provide a relatively significant axial stiffness to prevent deflections under pressure and eliminate contact with the blocker ring tab 92. The telescoping interface eliminates the possibility of seal extrusion which may otherwise contribute to reduced service life. The essentially all-metal alloy sealing system 90-5 also facilities operation at elevated temperatures.

Figure 15:
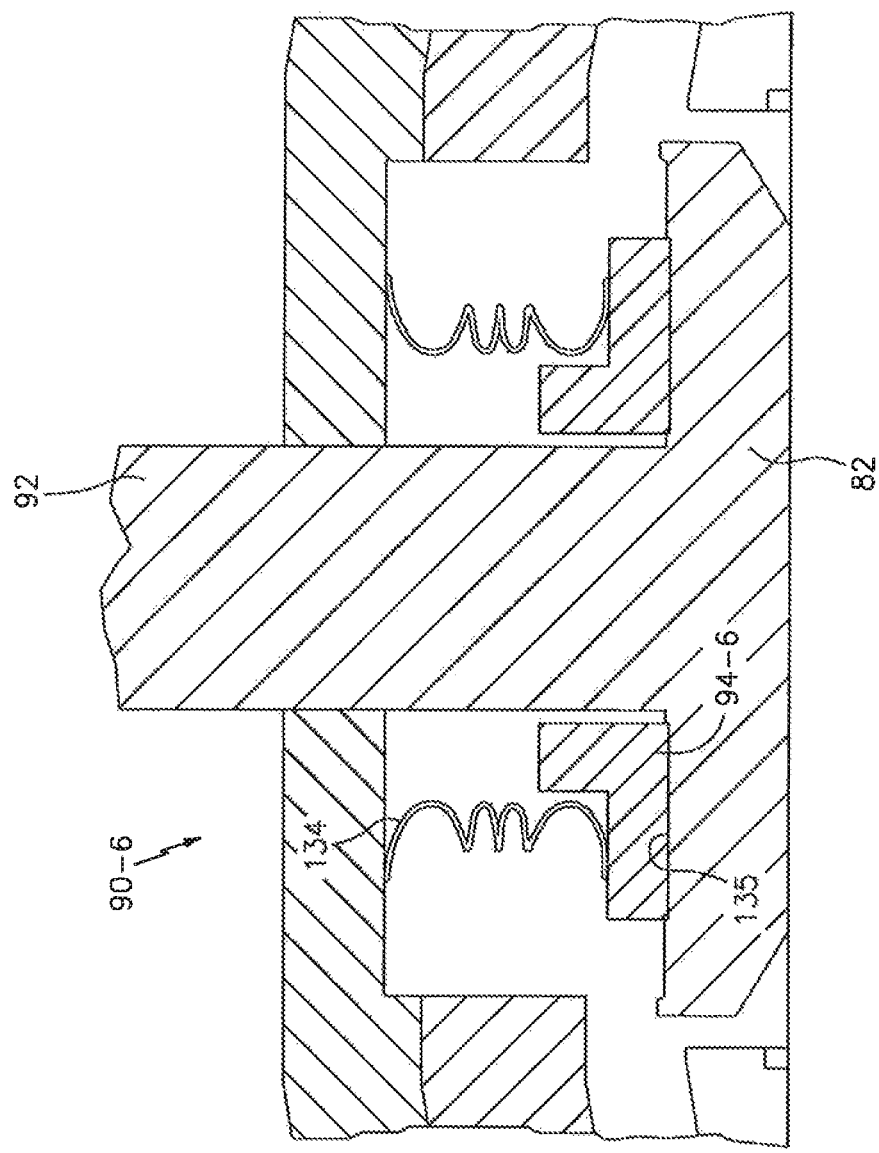
FIG. 15 is an expanded sectional view of a seal system for the duct blocker system according to another disclosed non-limiting embodiment.

With reference to FIG. 15, a sealing system 90-6 in another disclosed non-limiting embodiment generally includes a seal carrier 94-6 and a "W" seal 134. The seal carrier 94-6 rides on the forward blocker ring 82 and the "W" seal 134 maintains the seal carrier 94-6 in contact with the forward blocker ring 82 throughout the thermal growth range. A sliding surface 135 on the seal carrier 94-6 may also be lined with a low friction wear resistant material.

The seal carrier 94-6 and the "W" seal 134 may be manufactured of a metal alloy to facilitate an effective seal of the design space as well as provide stiffness to the sealing system 90-6 to prevent axial deflections under pressure and potential contact with the blocker ring tab 92. The metal alloy "W" seal 134 eliminates the compliant seal and thereby the possibility of seal extrusion which may otherwise contribute to reduced service life. The essentially all-metal alloy sealing system 90-6 also facilities operation at elevated temperatures.

Figure 16:
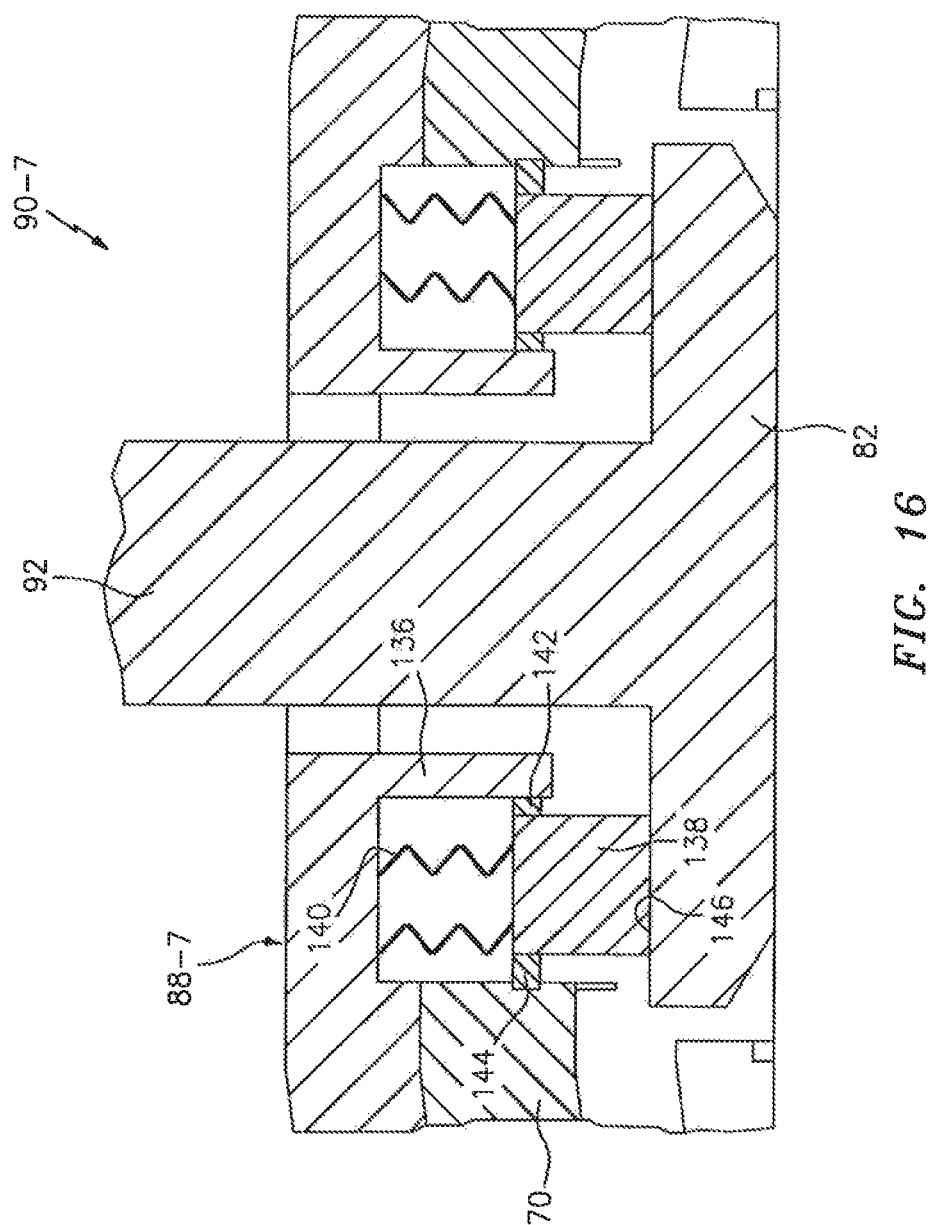
FIG. 16 is an expanded sectional view of a seal system for the duct blocker system according to another disclosed non-limiting embodiment.

With reference to FIG. 16, a sealing system 90-7 in another disclosed non-limiting embodiment generally includes a cover plate 88-7 with a radial flange 136, a seal carrier 138, a spring system 140, a compliant inner seal 142 and a compliant outer seal 144. The radial flange 136 surrounds the blocker ring tab 92 and extends into the outer case 70 toward the forward blocker ring 82.

The seal carrier 138 rides on the forward blocker ring 82 and the spring 140 maintains the seal carrier 138 in contact with the forward blocker ring 82 throughout the thermal growth range. A sliding surface 146 on the seal carrier 138 may also be lined with a low friction wear resistant material. The inner seal 142 and the outer seal 144 extend axially from the seal carrier 138 to respectively seal with the radial flange 136 and the outer case 70.

The metal alloy seal carrier 138 eliminates the possibility of seal extrusion which may otherwise contribute to reduced service life. The essentially all-metal alloy sealing system 90-7 also facilities operation at elevated temperatures.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
   a case extending around a longitudinal axis of the gas turbine engine;
   a cover plate radially outward of the case;
   a compliant seal that interfaces the cover plate and is adjacent to the case, wherein the compliant seal defines an "E" shape in cross-section, and wherein the "E" shape is defined by an outer leg, an inner leg, and a central leg radially located between the outer leg and the inner leg; and
   a seal carrier positioning the compliant seal within the case, the seal carrier dimensioned such that the seal carrier is adjacent to the case and the cover plate while limiting a deflection of the compliant seal, the seal carrier including a seal carrier flange in contact with the inner leg, and a portion of the seal carrier projecting out from the seal carrier flange and extending radially outward through the cover plate.

2. The gas turbine engine as recited in claim 1, wherein a surface of the seal carrier is lined with a wear resistant material.

3. The gas turbine engine as recited in claim 1, further comprising:
   a blocker ring,
   wherein the seal carrier extends radially outward through the cover plate to accommodate radial deflections due to thermal growth between the case and the blocker ring.

4. The gas turbine engine as recited in claim 1, further comprising:
   a blocker ring that includes a tab,
   wherein the seal carrier protects the compliant seal from contact with the tab.

5. The gas turbine engine as recited in claim 4, wherein the tab extends through a slot in the cover plate.

6. The gas turbine engine as recited in claim 1, wherein the outer leg is in contact with the cover plate, and wherein the seal carrier flange is radially inward of the compliant seal.

7. The gas turbine engine as recited in claim 6, further comprising:
   a blocker ring,
   wherein the seal carrier flange is non-linear and follows a radius of the blocker ring.

8. The gas turbine engine as recited in claim 1, wherein the seal carrier forms a telescoping space to encase the compliant seal.

9. The gas turbine engine as recited in claim 1, further comprising:
   a blocker ring,
   wherein said case includes a first material and said blocker ring includes a second material, said first material different than said second material.

10. The gas turbine engine as recited in claim 1, further comprising:
    a blocker ring mounted within a fan duct.

11. The gas turbine engine of claim 1, wherein the portion of the seal carrier projects through the compliant seal and subsequently through an aperture in the cover plate.

12. The gas turbine engine of claim 1, wherein the compliant seal has an elongated cross-sectional geometry when viewed in a plane perpendicular to a centerline of the compliant seal.

13. A gas turbine engine, comprising:
a case;
a cover plate;
a compliant seal interfacing with the cover plate and adjacent the case, the compliant seal configured with an "E" shaped cross-sectional geometry formed by an outer leg, an inner leg, a central leg and a tubular backbone segment;
the tubular backbone segment extending from an inner end of the compliant seal to an outer end of the compliant seal, and the tubular backbone segment having an oval cross-sectional geometry;
the outer leg cantilevered from the tubular backbone segment at the outer end;
the inner leg cantilevered from the tubular backbone segment at the inner end; and
the central leg cantilevered from the tubular backbone segment and located between the inner leg and the outer leg; and
a seal carrier positioning the compliant seal within the case, the seal carrier comprising a seal carrier flange that projects through the cover plate.

14. The gas turbine engine of claim 13, wherein the central leg projects out from the tubular backbone segment to a distal end, and a thickness of the central leg flares outward at the distal end.

15. The gas turbine engine of claim 13, wherein the seal carrier further comprises a base, and the seal carrier flange projects out from the base, through the compliant seal and subsequently into an aperture in the cover plate.

16. A gas turbine engine comprising:
a case;
a cover plate;
a compliant seal that interfaces the cover plate and is adjacent to the case, wherein the compliant seal defines an "E" shape in cross-section, and wherein the "E" shape is defined by an outer leg, an inner leg, and a central leg radially located between the outer leg and the inner leg; and
a seal carrier positioning the compliant seal within the case, the seal carrier dimensioned such that the seal carrier is adjacent to the case and the cover plate while limiting a deflection of the compliant seal, the seal carrier including a seal carrier flange in contact with the inner leg, and a portion of the seal carrier projecting out from the seal carrier flange and extending radially outward through the cover plate;
wherein the compliant seal has an oval cross-sectional geometry.

* * * * *